United States Patent [19]

Poelstra

[11] Patent Number: 5,563,650
[45] Date of Patent: Oct. 8, 1996

[54] METHOD AND DEVICE FOR PRODUCING PANORAMIC IMAGES, AND A METHOD AND DEVICE FOR CONSULTING PANORAMIC IMAGES

[75] Inventor: Theo J. Poelstra, Apeldoorn, Netherlands

[73] Assignee: Geeris Holding Nederland B.V., Netherlands

[21] Appl. No.: 256,754

[22] PCT Filed: Nov. 24, 1993

[86] PCT No.: PCT/EP93/03318

§ 371 Date: Sep. 28, 1994

§ 102(e) Date: Sep. 28, 1994

[87] PCT Pub. No.: WO94/13100

PCT Pub. Date: Jun. 9, 1994

[30] Foreign Application Priority Data

Nov. 24, 1992 [NL] Netherlands ............... 92.02046
Nov. 24, 1992 [NL] Netherlands ............... 92.02047

[51] Int. Cl.⁶ .................................................. H04N 7/18
[52] U.S. Cl. ............................................. 348/36; 348/147
[58] Field of Search ................. 348/36, 147; H04N 7/18

[56] References Cited

U.S. PATENT DOCUMENTS 4,549,208 10/1985 Kamejima ..................... 348/147
5,185,667 2/1993 Zimmermann ................. 348/36

FOREIGN PATENT DOCUMENTS

0111909A3 6/1984 European Pat. Off. ......... H04N 7/18
9004831 5/1990 WIPO ............................. G06F 15/20

OTHER PUBLICATIONS

Patent Abstract of Japan Patent Publication No. JP63216180, vol. 13, No. 9, Jan. 11, 1989, 1 p.
Patent Abstract of Japan Patent Publication No. 2-127877(A), vol. 14, No. 362, Aug. 6, 1990, 2 pp.
Patent Abstract of Japan Patent Publication No. JP3024858, vol. 15, No. 148, Apr. 15, 1991, 1 p.

Primary Examiner—Howard W. Britton
Attorney, Agent, or Firm—Web Ziesenheim Bruening Logsdon Orkin & Hanson, P.C.

[57] ABSTRACT

A method for producing panoramic images whereby a shot is made from a desired shooting position, with the use of a camera having fish eye optics whereby the image is scanned and then digitized, images are transformed into a panoramic image with the use of a computer and software. The digital image is scanned by dividing the image into narrow radial segments, each of which is divided into a number of parts of equal length whereafter each segment part is depicted as a point on a straight line, whereby the grey tint of each segment part is corrected for the modified surface on which it is depicted. Apparatus comprises a camera with fish eye optics and a CCD matrix imager upon which the image to be obtained is projected, obtaining immediately an image in digital form.

11 Claims, 5 Drawing Sheets

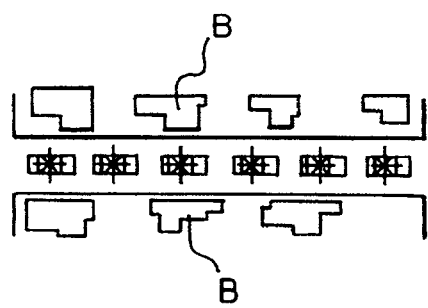
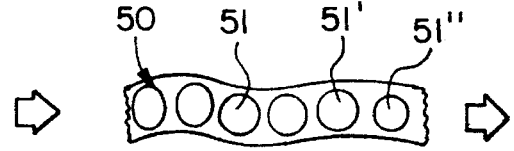
FIG. 8A   FIG. 8B
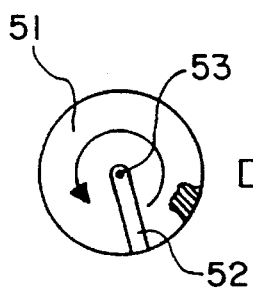
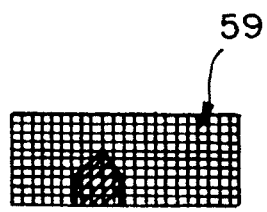
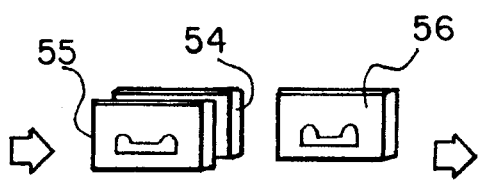
FIG. 8C   FIG. 8D   FIG. 8E
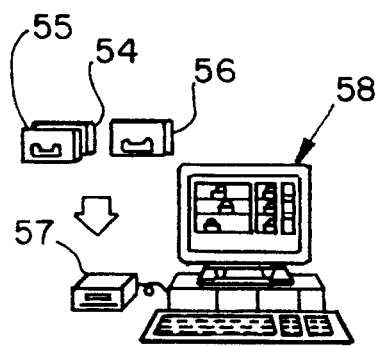
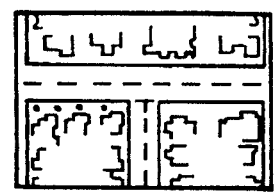
FIG. 9A   FIG. 9B   FIG. 9C

METHOD AND DEVICE FOR PRODUCING PANORAMIC IMAGES, AND A METHOD AND DEVICE FOR CONSULTING PANORAMIC IMAGES

BACKGROUND OF THE INVENTION

It is a problem that people of ten have to go to a certain place in order to view the surroundings. To take one or more photographs of a certain object is often not enough, because it appears, that when these photos are consulted at another place, for instance at the office, that certain information and details can not be satisfactorally seen. Similar problems can occur with, for example, estate agents, where buyers are eager for information about certain objects offered for sale. The estate agent often has a view of the object to be sold but not of the direct surroundings. Council officials also need to view objects so that, for instance, tree felling licenses can be issued, building applications checked, or that the eventual suitability of a building initiative in an existing situation can be controlled and assessed, or that a town planner's designs, and the suitability of these designs in existing situations can be assessed.

The production of panoramic images whereby the whole surroundings from one point can be observed is known. For this purpose a number of photos can be taken, with a photographic camera, which can then be put together to form a panoramic image. This method is however very time consuming and requires a large shooting storage in the case where a certain area requires more than the usual number of shots in order to be produced and recorded. It is also very difficult to quickly and accurately find a desired image from such a file.

SUMMARY OF THE INVENTION

According to a first object of the invention, a system is provided whereby a large number of panoramic images can be made in a short time, in simple manner can be recorded and then very quickly, at a desired moment, consulted.

Such object can be met with a method according to the invention, by which a shot of the surroundings is made from a desired shooting position with the help of a camera with a fish eye optic, and whereafter the obtained image is scanned with the aid of scanning means, after which the obtained images, in digital form, are transformed into a panoramic image with the help of a computer and software.

The registering of complete surroundings in a single image, with the help of a fish eye optic is already known. However the images obtained thus, are very difficult to be interpreted in the correct manner by the human eye. Because the images obtained give a very distorted image with respects to that as seen by the human eye, it is very difficult to interpret these images in order to obtain the desired information.

With this method according to the invention, images are achieved, obtained with a fish eye optic, which are firstly transformed in such a manner that they approach an image which can be interpreted by the human eye. By recording these images in digital form in a computer, a certain desired image can be consulted very quickly from a large number of recorded images.

According to another aspect of the present invention a method is provided for transforming fish eye images into panoramic images, comprising the following steps:

centering a scanning means onto the center of an obtained fish eye image; and rotatingly scanning the fish eye image by a rotating scanning array of aligned light sensitive elements such that the fish eye image is divided into successive radial parts which are transformed into successive parts of a panoramic image.

A apparatus is preferably employed for the production of digital fish eye images according to the invention, whereby the apparatus comprises a camera provided with a fish eye optic and the image area is provided with a CCD-matrix on which the obtained image is projected, whereby an image in digital form is immediately obtained. It is possible, with such a apparatus, to immediately transform the images obtained with the fish eye optic into digital forms, whereby the step of firstly obtaining a photographic depiction, with the help of a fish eye optic, can be omitted.

In general there is an increased need to be able to visually observe the surroundings and/or details of certain objects quickly, without having to be at the location where the object is. For instance in estate agency, there is a need to have images, et the office, of certain objects that are for sale, or for hire, to show to the buyers or hirers, whereby the images not only show the object but can also give a good impression of the objects neighbourhood. The police, fire brigade, advertising bureaus, public service industries, and council services, etc. also need to have visual information of the neighbourhood of a certain place, at the office. For cases concerning, for example, town planning, building and housing inspection, property tax, land management and so forth, extra information is frequently needed, which at the moment is obtained by visiting the place concerned. It can be of great importance for the police or fire brigade to posess information concerning the neighbourhood of certain objects and thus to be able to consult this information, before any possible action needs to be taken at these places concerned.

According to another aspect of the present invention a method and system is provided whereby it is possible with the help of this system and a computer and software, to record information and thereafter to be able to call up the desired information quickly.

The object of the invention is achieved by recording a large number of panoramic images, in digital form in a computer, taken from successive shooting positions, whereby the shooting positions are chosen in such a way, that there exists a connection between them. For example, the shooting positions are chosen such that parts of the images, taken from two successive shooting positions, partly overlap each other or that the only images concerned are panoramic images of, for example, objects to be sold by an estate agent.

BRIEF DESCRIPTION OF THE DRAWINGS

Further features, advantages and details will be clarified in the following description in which reference is made to the annexed drawings, in which:

FIGS. 8A–E show respective diagrams in the processing of the pictures of the system of FIG. 1; and FIGS. 9A and, 9B and 9C show respective images obtained with the system of FIG. 1.

DESCRIPTION OF THE PREFERRED EMBODIMENTS

Figure 1:
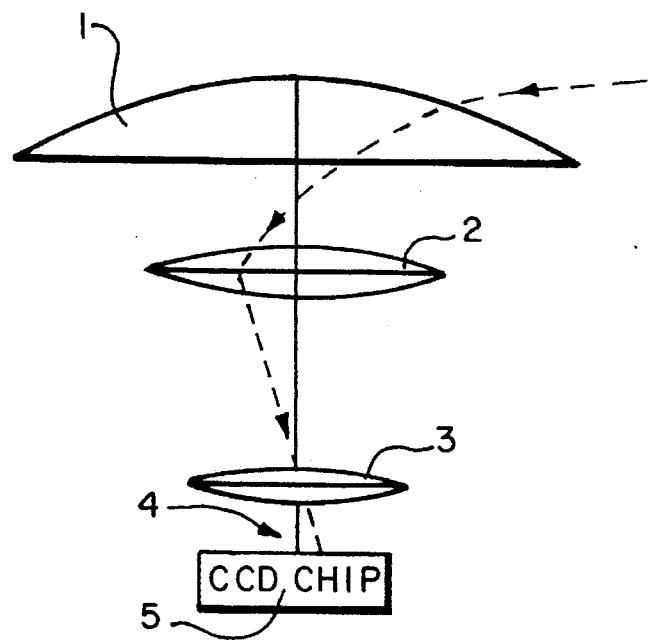
FIG. 1 shows a schematic assembly of a camera for the production of digital images according to the invention.

The schematic representation reproduced in FIG. 1 of a CCD-camera, according to the invention, consists of a fish eye optic 1, a field lens 2, an imaging objective 3 and an image area 4 on which a CCD (Charged Coupled Device) chip 5, of for example 2.048×2.048 pixels, is placed.

Figure 2:
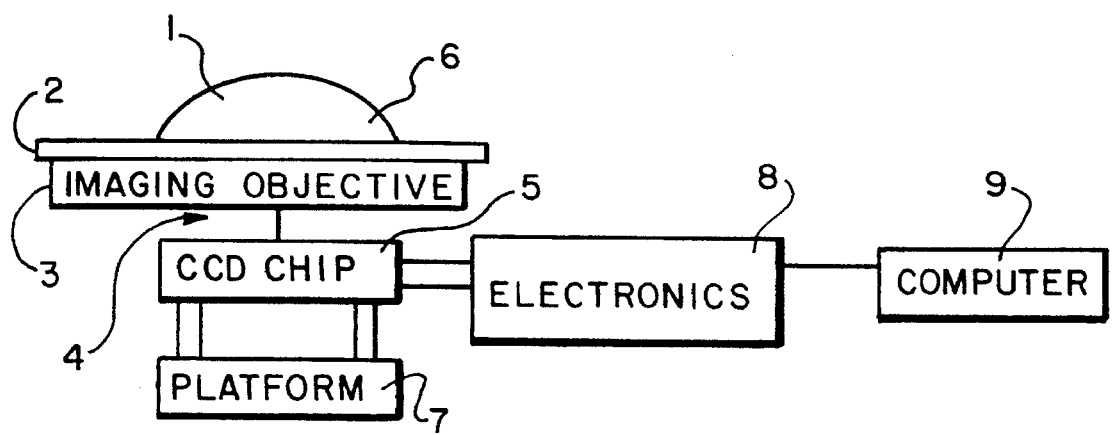
FIG. 2 shows a block diagram of a digital camera system.
Figure 3:
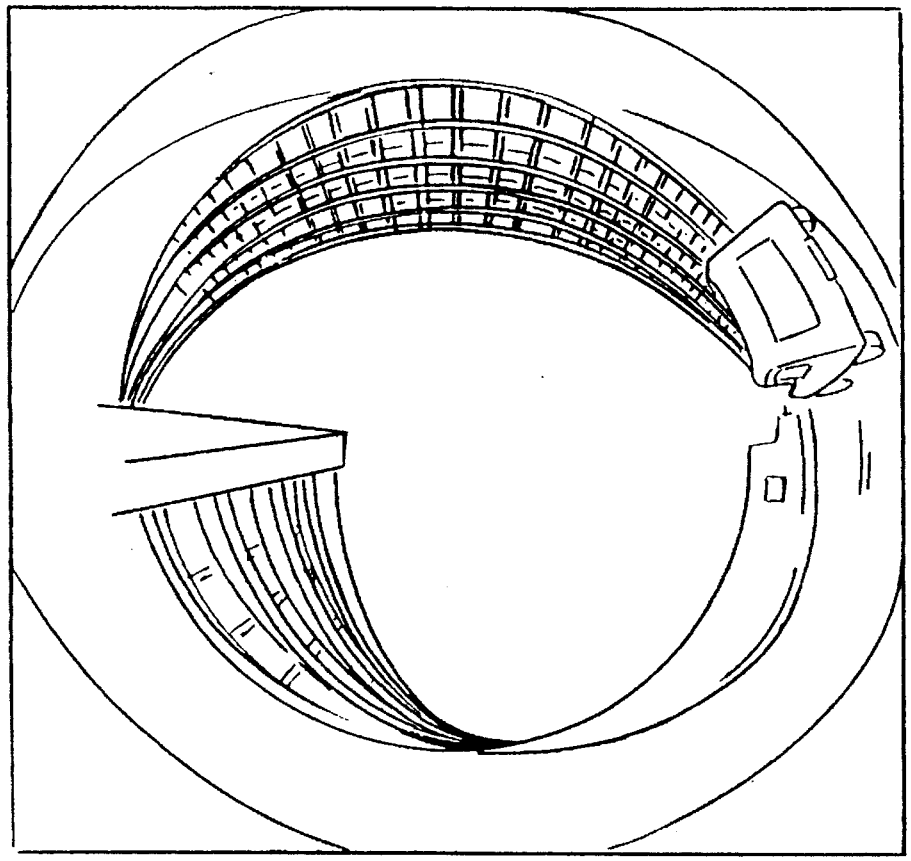
FIG. 3 shows a fish eye photo after it has been registered in digital form.
Figure 4:
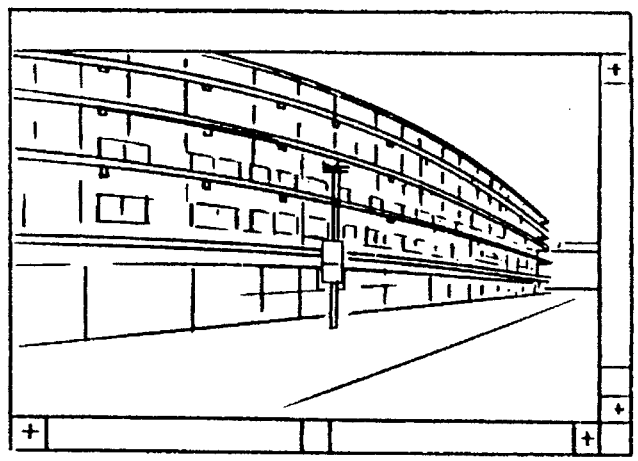
FIG. 4 shows a part of a fish eye photo after it has been transformed into a panoramic image according to the invention.

FIG. 2 shows a block diagram of a digital camera system, consisting of fish eye optic 6 that comprises a fish eye lens 1, a field lens 2, an imaging objective 3, and an image area 4 on which CCD-sensors of one or more CCD-chips 5, are placed. The whole system can be, for instance, secured red on a platform that is in turn secured onto a car, the platform being given the number 7 in the block diagram. The signals can then be processed and checked, immediately or afterwards, with the help of electronics. This is indicated by the number 8. Following this, the obtained shots can be recorded in a computer 9. Moving recordings in the field can be made with a moving recording vehicle, provided with a camera system so as shown in FIG. 2. The driving speed and number of images to be taken can be determined from beforehand in order to obtain the desired accuracy in the images, so that the desired details are clear enough.

Figure 5:
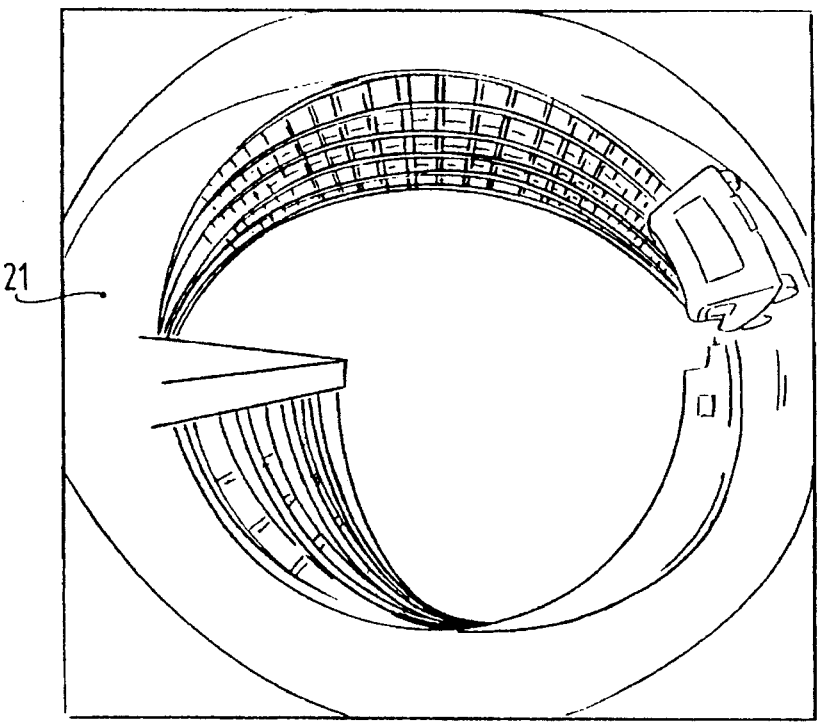
FIG. 5 shows a fish eye image of the surroundings of a shooting position.
Figure 6:
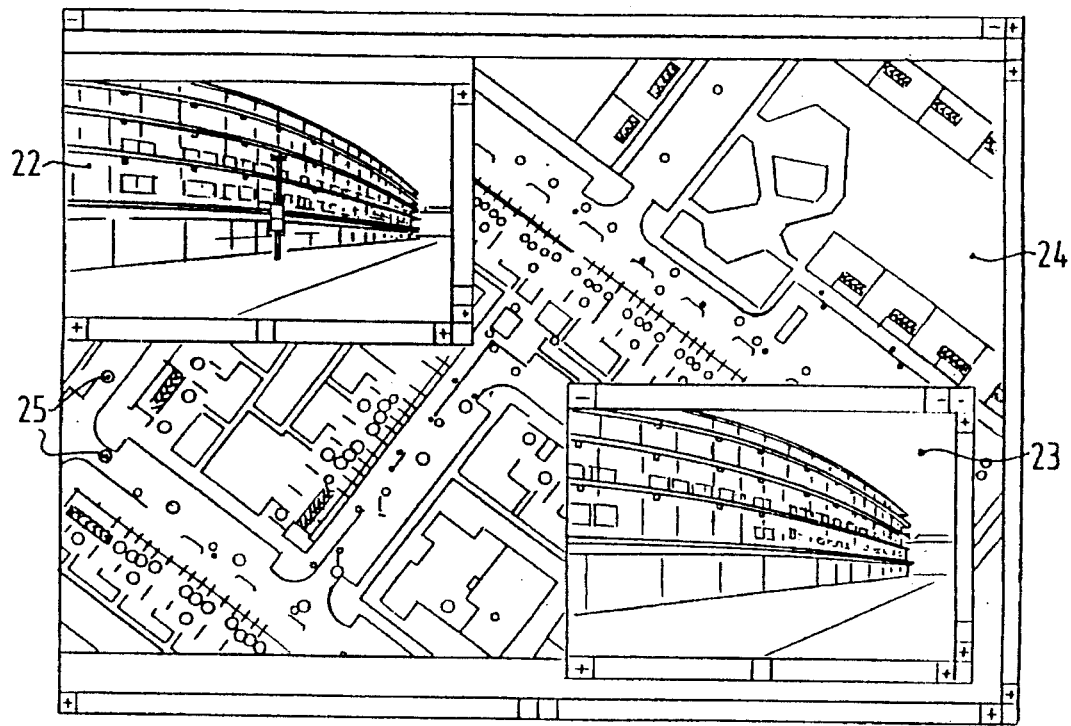
FIG. 6 shows a map, according to the invention, together with an image of part of two successive panoramic images.

FIG. 5 shows a fish eye shot 21, which has been digitally registered and then recorded in a computer. This is the panoramic image before it has been converted into a panoramic image which is able to be interpreted by the human eye. In FIG. 6, a transformed image 22 is shown of the image 21, as observed in FIG. 5, whilst at the same time a second image 23 is shown of a preceding panoramic image. A part of map 24 is also observed, on which the different points from where the shots were taken are given by a few dots 25.

This lay out consists of a part of a map of a developed area, whereby the different points from which shots have been made are not only at the front of the development, but also at the baal, i.e. in the gardens of diverse buildings.

The method is also very suitable to be used in buildings. One can think of mansions or large buildings in need of renovation. The method is also very useful in order to make a record of the changes occurring in, for instance, the nature.

Figure 7:
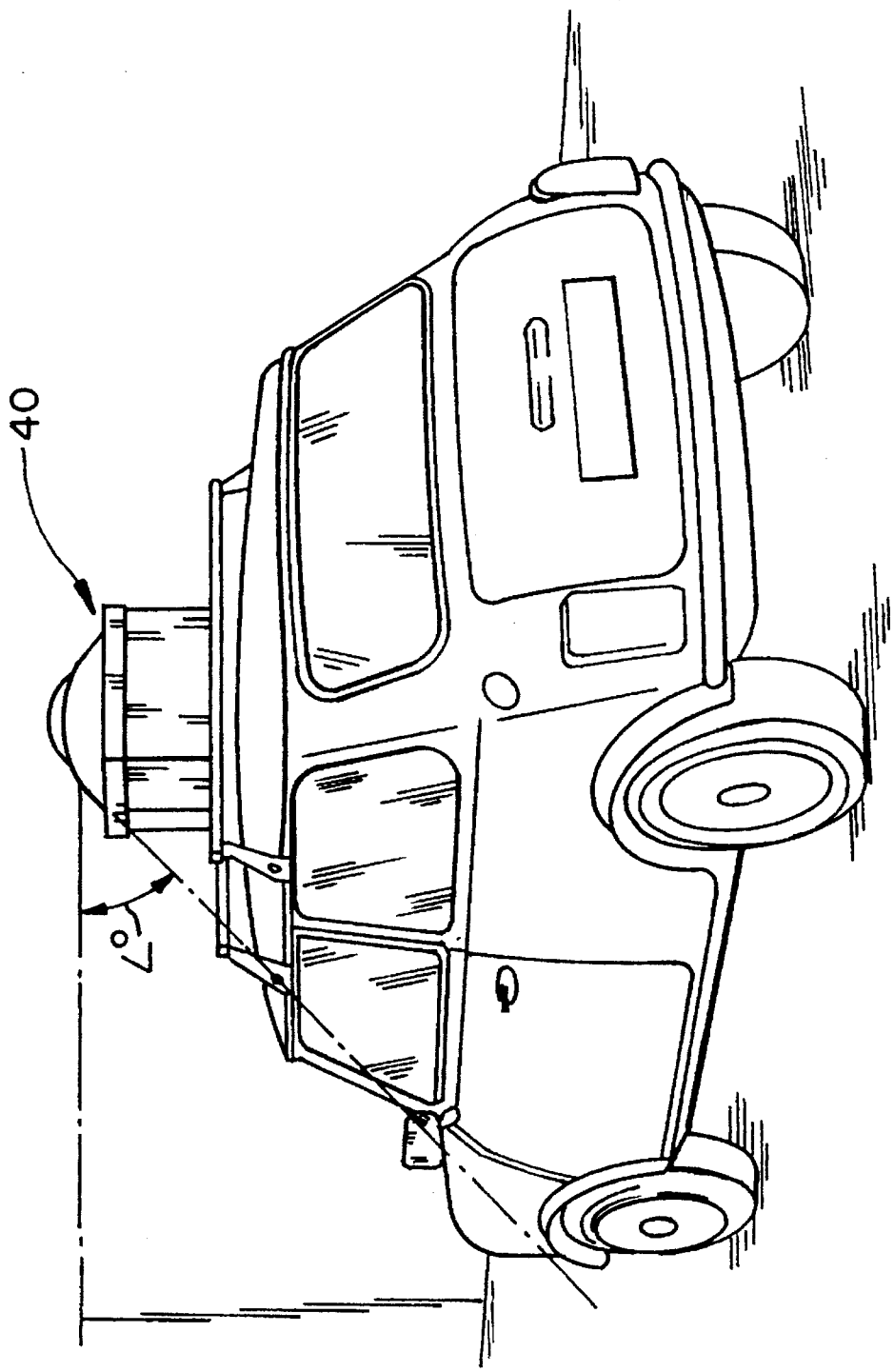
FIG. 7 shows a perspective view of a further preferred embodiment of the system and method according to the present invention.

In a further preferred embodiment of the invention (FIG. 7) a mobile recording system 40 is mounted on top of a relatively low vehicle, such as an automobile of the type Mini, so that the angle gamma (F) of 30° under the horizontal provides for a recording as close as possible to the vehicle. The mobile recording system 40 comprises a camera housing for black-and-white rolling film having a width of 70 mm, a stabilized platform on which the camera housing is mounted and a computer including interface electronics and control software, mounted inside the vehicle.

If a street S with buildings B (FIG. 8A) is to be surveyed, for instance six fish eye recordings are made from the respective positions, which recordings are embodied on a tape of film 50 (SB) which the respective recordings are numbered 51, 51' and 51". The recordings 51, 51', 51" are scanned by a rotating CCD-scanner 52 (FIG. 8C) of which the pivot 53 is accurately positioned in the center of a recording 51. For the purpose of image viewing, viz. not for the purpose of geodetic measurements, an image frame of approximately 1.9 megabyte is sufficient, which amount of information can still be reduced further by image compressing techniques. From the scanner 52 two dimensional images 59 (FIG. 8D) are obtained, which images are stored on tapes e.g. cassettes 54, 55 of the DAT-format. For geodatic image measurements an information amount of 88 megabyte is considered to be sufficient. For the purpose of image viewing however such information density can be reduced with at least one order of magnitude.

The cassettes 54, 55 are stored and used together with a further cassette 56 on which an overview image including known reference points is recorded. With aid of the cassettes 54, 55, 56, a DAT recorder 57 (FIG. 9A, 9B) and a personal computer 58 the images of a number of cassettes, (more than images from the one street as shown), can be integrated and linked to a map, together with position data, such as the address and/or code for an object or building which is included in the image, see FIG. 9C.

If someone wishes to obtain information from the system, he can request a map on a screen (FIG. 10) and subsequently point to a building or a position, e.g. by a mouse, such that images 61, 62 and/or 63 are shown on the map.

I claim:

1. A method for producing panoramic images comprising the steps of:

making a surroundings shot from a desired shooting position with a camera having a fish eye optic to obtain a fish eye image;

centering a scanning means onto the center of said obtained fish eye image;

rotatingly scanning said fish eye image by a rotating scanning array of aligned light sensitive elements such that the fish eye image is divided into successive radial parts in a digital form; and transforming said successive radial parts into a panoramic image with a computer and software.

2. The method according to claim 1, wherein said fish eye image is a photographic image on the center of which a pivoting image device is centered.

3. The method according to claim 1, wherein said panoramic image has an information density of approximately 1.9 megabyte.

4. The method according to claim 1, wherein said panoramic image has an information density of 8.8 megabyte or less.

5. A method for producing panoramic images comprising the steps of:

making a surroundings shot from a desired shooting position with a camera provided with a fish eye optic and an image area provided with a CCD-matrix;

obtaining a fish eye image in digital form with said CCD-matrix; and transforming said image in digital form into a panoramic image with a computer and software to remove distortions and render said image in a form which can be perceived by the human eye without said distortions.

6. A method for assembling a file of object images from which one or more desired images can be quickly consulted, comprising the steps of:

taking a large number of panoramic images from successive shooting positions with a camera provided with a fish eye optic whereby said shooting positions are chosen such that said images taken from said successive shooting positions partly overlap to obtain fish eye images;

digitizing said fish eye images;

transforming said digitized fish eye images into panoramic images with a computer and software to remove distortions and render said images in a form which can be perceived by the human eye without said distortions;

recording said panoramic transformed digitized fish eye images in a computer;

creating a layout; and storing said layout in said computer along with said panoramic images recorded in said computer wherein points are indicated on said layout from which said panoramic images were taken, and on which said panoramic images are stored.

7. The method according to claim 6, wherein a part of said panoramic images is displayed as a quadrant.

8. The method according to claim 4 further comprising the step of associating information with said panoramic images and/or said layout by recording said information in said computer along with said panoramic images or said layout.

9. The method according to claim 8, wherein said information is one or more of the set consisting of address, date, time, orientation, compass direction, house numbers and street names.

10. A computerized system for assembling and reviewing a file of panoramic images associated with a layout and additional information such that one or more images can be simply consulted from said file, said system comprising:

a computer including a data storage means;

one or more panoramic images obtained from one or more shooting positions wherein said panoramic images are digitized and transformed with a computer and software to remove distortions and render said images in a form which can be perceived by the human eye without said distortions, whereupon said images are stored in digital form in said computer;

a layout stored in digital form in said computer on which points are indicated from which said one or more panoramic images were made; and additional information stored in said computer, said additional information providing access to a desired image and whereby said one or more panoramic images can be divided up into arbitrary sections, said sections including quadrants, dependent on a desired viewing direction from a particular shooting position.

11. The system of claim 10, wherein said additional information is one or more of the set consisting of address, date, time, orientation, compass direction, house numbers and street names.

\* \* \* \* \*

UNITED STATES PATENT AND TRADEMARK OFFICE
CERTIFICATE OF CORRECTION

PATENT NO. : 5,563,650
DATED : October 8, 1996
INVENTOR(S) : Theo J. Poelstra

It is certified that error appears in the above-indentified patent and that said Letters Patent is hereby corrected as shown below:

Column 1 Line 9 "of ten" should read --often--.

Column 3 Line 11 "9A and, 9B and 9C" should read --9A, 9B and 9C--.

Column 3 Line 26 "secured red" should read --secured--.

Column 3 Line 59 "(F)" should read --(Γ)--.

Column 4 Line 2 "(SB)" should read --(8B)--.

Claim 8 Line 23 Column 5 "claim 4" should read --claim 6--.

Signed and Sealed this

Seventh Day of January, 1997

BRUCE LEHMAN

Attesting Officer     Commissioner of Patents and Trademarks